(12) United States Patent
Grau

(10) Patent No.: US 7,140,351 B2
(45) Date of Patent: Nov. 28, 2006

(54) METHOD AND DEVICE FOR OPERATING AN INTERNAL COMBUSTION ENGINE

(75) Inventor: Kai-Uwe Grau, Neuenstadt (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/888,651

(22) Filed: Jul. 9, 2004

(65) Prior Publication Data

US 2005/0022788 A1 Feb. 3, 2005

(30) Foreign Application Priority Data

Jul. 17, 2003 (DE) .................. 103 32 517

(51) Int. Cl.
*F02P 5/15* (2006.01)

(52) U.S. Cl. ............... 123/406.24; 123/406.27; 123/436

(58) Field of Classification Search ........ 123/406.2, 123/406.24, 406.25, 406.27, 435, 436
See application file for complete search history.

(56) References Cited

U.S. PATENT DOCUMENTS

| 5,131,370 A * | 7/1992 | Chikamatsu et al. .. 123/406.32 |
| 5,197,431 A * | 3/1993 | Takaba et al. ......... 123/406.46 |
| RE34,234 E * | 4/1993 | Kuroiwa et al. ....... 123/406.27 |
| 5,259,357 A * | 11/1993 | Shimizu et al. ............. 123/638 |
| 6,520,159 B1 | 2/2003 | White et al. ................ 123/481 |
| 2004/0084026 A1* | 5/2004 | Zhu et al. .................... 123/435 |

FOREIGN PATENT DOCUMENTS

| DE | 197 06 126 | 8/1998 |
| DE | 199 45 811 | 3/2001 |
| JP | 3-124967 A * | 5/1991 ............ 123/339.11 |

* cited by examiner

*Primary Examiner*—T. M. Argenbright
(74) *Attorney, Agent, or Firm*—Kenyon & Kenyon LLP

(57) ABSTRACT

A method and a device for operating an internal combustion engine allow an optimal restriction of the ignition angle. In this context, a limit value for an ignition angle is specified as a function of an operating point of the internal combustion engine. The limit value for the ignition angle is corrected as a function of a misfire limit of the internal combustion engine.

9 Claims, 2 Drawing Sheets

METHOD AND DEVICE FOR OPERATING AN INTERNAL COMBUSTION ENGINE

BACKGROUND INFORMATION

From U.S. Pat. No. 6,520,159 it is known to ascertain the number of combustion misses with the aid of a counter.

From German Patent Application No. DE 199 45 811 a combustion-miss detection method is known in which a measure for the irregular running of the combustion engine is formed and compared to a threshold value that is a function of the load of the combustion engine, an exceeding of this threshold value being evaluated as combustion miss.

From German Patent No. DE 197 06 126 it is known to describe the combustion-miss detection via fluctuations of the angular velocity of the crankshaft. The general engine-speed tendency and, additionally, irregular engine-speed changes are taken into account. The described method provides an irregular running value, which is proportional to the change in the angular velocity of the crankshaft. The irregular running value thus obtained is subsequently compared to a limit value, and a combustion miss is detected if the irregular running value exceeds the limit value.

SUMMARY OF THE INVENTION

The method according to the present invention and the device according to the present invention for operating an internal combustion engine have the advantage over the related art that a limit value for an ignition angle is predefined as a function of an operating point of the internal combustion engine and that the limit value for the ignition angle is corrected as a function of a misfire limit of the internal combustion engine. On the one hand, this makes it possible to limit a retard shifting of the ignition angle, thereby preventing an unintended shut-down of the internal combustion engine. On the other hand, the restriction on the retard shifting of the ignition angle may be adapted to the specific combustion engine of the internal combustion engine and its state, so that it is possible to achieve maximum retard shifting of the ignition angle for the specific combustion engine and its state without the combustion engine shutting down. In particular the generation of a torque reserve, for example for engine-control functions such as drivability functions and/or catalytic heating, may be optimized in this manner.

It is particularly advantageous if the misfire limit of the internal combustion engine is ascertained as a function of an irregular running of the internal combustion engine. This constitutes an especially simple possibility of determining the misfire limit, which, furthermore, does not require an additional sensory system but may be realized with the aid of a crank-angle sensor or engine-speed sensor, which is provided anyway.

The same also applies if the misfire limit of the internal combustion engine is ascertained as a function of the number of combustion misses. The detection of the combustion misses may likewise be implemented with the aid of a crank-angle or engine-speed sensor, which is utilized in any event.

It is particularly advantageous if the limit value for the ignition angle is corrected in the retard direction if the misfire limit of the internal combustion engine is not reached for a first preselected time. The limit value for the ignition angle may thus be shifted in the retard direction and a higher torque reserve be realized in the process. As a result, the operating range of the internal combustion engine is able to be utilized more optimally or more fully up to the actual misfire limit, i.e., the limit value for the ignition angle is corrected in the direction of the actual misfire limit.

It is also advantageous if the limit value for the ignition angle is corrected in the advance direction if the misfire limit of the internal combustion engine is exceeded for a second preselected time. In this manner, a limit value for the ignition angle that is too high may be corrected again in the direction of the actual misfire limit of the internal combustion engine in order to prevent an unintended choking or shutdown of the internal combustion engine.

Furthermore, it is particularly advantageous if a new correction value for the correction of the ignition angle-limit value for at least one operating point of the internal combustion engine is adapted from a previous correction value. In this way, the actual misfire limit of the internal combustion engine may be learned and adapted to the specific combustion engine and its state, for example as a function of age and wear and/or driver type, and thereby be adapted to the usual operating range of the internal combustion engine. Consequently, the individual combustion engine may be assigned a misfire limit that comes as close as possible to its actual misfire limit.

A further advantage comes about if the adaptation of the correction value is implemented using a predefined adaptation increment. In this way, the adaptation may be realized in an especially simple and iterative manner and thus especially reliably and precisely if suitable adaptation increments are selected.

DETAILED DESCRIPTION

Figure 1:
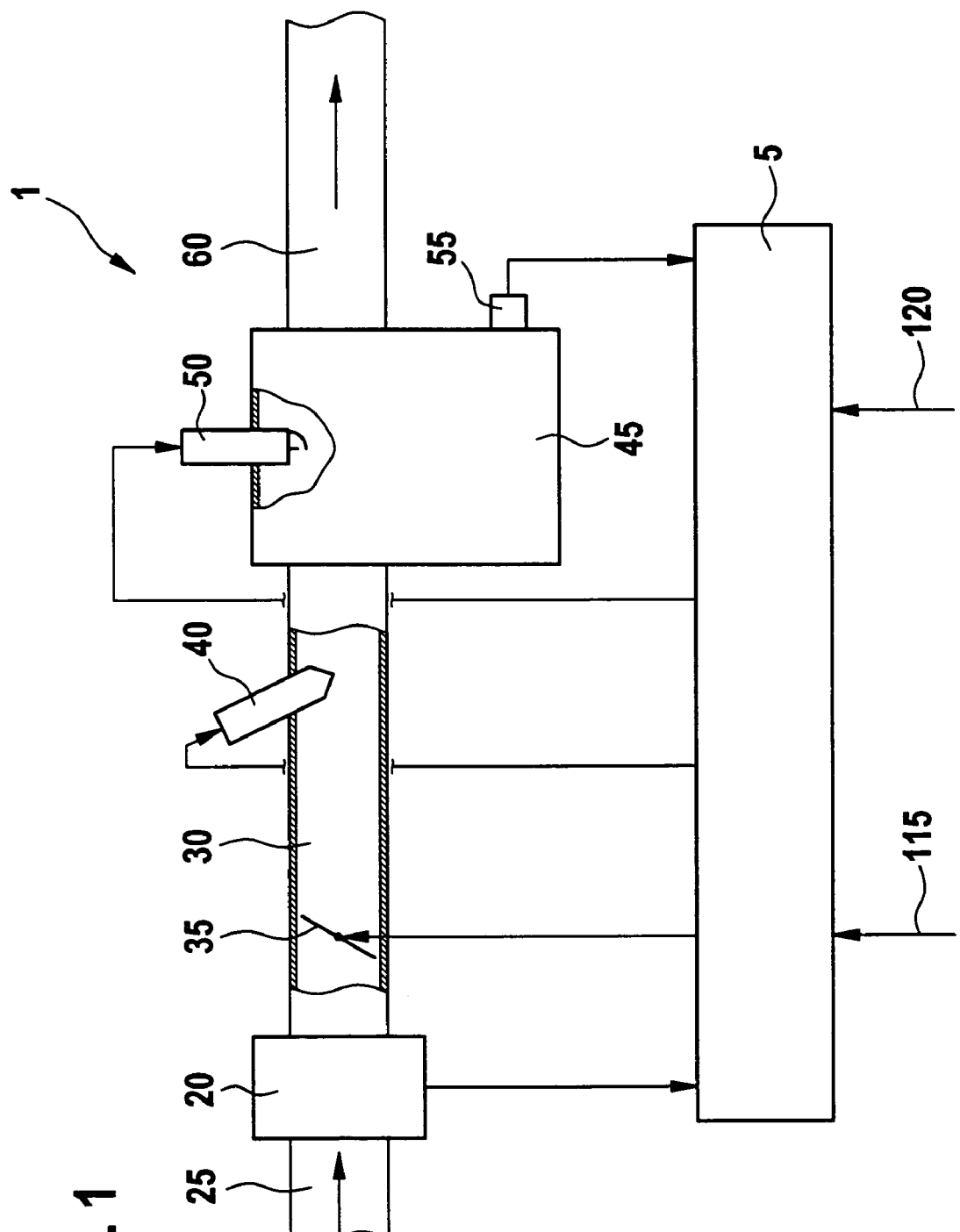
FIG. 1 shows a schematic view of an internal combustion engine in the form of a block diagram.

In FIG. 1, reference numeral 1 designates an internal combustion engine of a motor vehicle, for example. Combustion engine 1 includes a combustion engine 45, which in this example is embodied as a spark-ignition engine. Via an air supply 25, combustion engine 45 is supplied with fresh air. The flow direction of the fresh air is indicated by an arrow in FIG. 1. The fresh air-mass flow conveyed to combustion engine 45 via air supply 25 is recorded by a mass air-flow sensor 20. Mass air-flow sensor 20 relays the measured value for the fresh air-mass flow to an engine control 5 as a measure for the engine load. Mass air-flow sensor 20 may be configured as hot-film air-mass meter, for example. Arranged in air supply 25, downstream from air mass air-flow sensor 20 in the flow direction of the fresh air, is a throttle valve 35 whose opening degree is adjusted by engine control 5 to achieve a desired charge of the cylinders of combustion engine 45. As a result, the opening degree of throttle valve 35 also influences the fresh air mass-flow measured by mass air-flow sensor 20. The section of air supply 25 between throttle valve 35 and combustion engine 45 is also known as the intake manifold and is designated by reference numeral 30 in FIG. 1. According to FIG. 1, a fuel injector 40 via which fuel is injected into intake manifold 30 is arranged in intake manifold 30. Engine control 5 controls fuel injector 40 for the adjustment of a predefined fuel-mass flow in order to set a predefined air/fuel mixture ratio in a combustion chamber of combustion engine 45, for example.

The air/fuel mixture reaching the combustion chamber of combustion engine 45 is ignited by a spark plug 50 in the individual cylinder, thereby driving a crankshaft in this known way. Alternatively, the injection may also be performed directly into the combustion chamber.

The rotation of the crankshaft is detected by a crankshaft sensor or engine-speed sensor 55 at combustion engine 45 in a manner known to one skilled in the art. The crankshaft-angle signal or the engine-speed signal is relayed to engine control 5. Engine control 5 also controls spark plug 50 to set a predefined ignition firing point or ignition angle. The waste gas produced during the combustion of the air/fuel mixture in the combustion chamber is forwarded to exhaust branch 60 and flows away from combustion engine 45 in the arrow direction. The control of the opening degree of throttle valve 35, the fuel-mass flow via fuel injector 40 and the ignition firing point or the ignition angle of spark plug 50 may be implemented by engine control 5 as a function of one or a plurality of torque requests 115 to 120, for example. In a manner known to one skilled in the art, engine control 5 coordinates torque requests 115 to 120 into a resulting torque request, which is then implemented by appropriate control of throttle valve 35, fuel injector 40 and spark plug 50. Torque requests 115 to 120 may originate from a driving-pedal module, for instance, and define a driver-desired torque, and/or from additional vehicle functions, such as an anti-lock braking system, a traction control, a vehicle-speed control, an anti-judder function, an idle speed control, a catalytic-converter heating function, etc.

For some of the described vehicle functions or drivability functions and especially also for the catalytic heating, it may be necessary to generate a torque reserve, which is realized by shifting the ignition angle to retard. However, shifting the ignition angle to retard makes sense only until a misfire limit of internal combustion engine 1 or combustion engine 45 is reached, since combustion engine 45 may otherwise shut off. According to the present invention, on the one hand, it is now provided to limit the retard shift of the ignition angle in such a way that the actual misfire limit of internal combustion engine 1 or combustion engine 45 is not exceeded and, on the other hand, to individually adapt this restriction to specific combustion engine 45 and its state or behavior and its normally utilized operating range so as to be able to utilize the possible operating range of combustion engine 45 as completely as possible up to the actual misfire limit, in particular when generating torque reserves. The state of combustion engine 45 may change, for example as a result of an engine cleaning or a replacement of the exhaust-gas system or engine aging.

Figure 2:
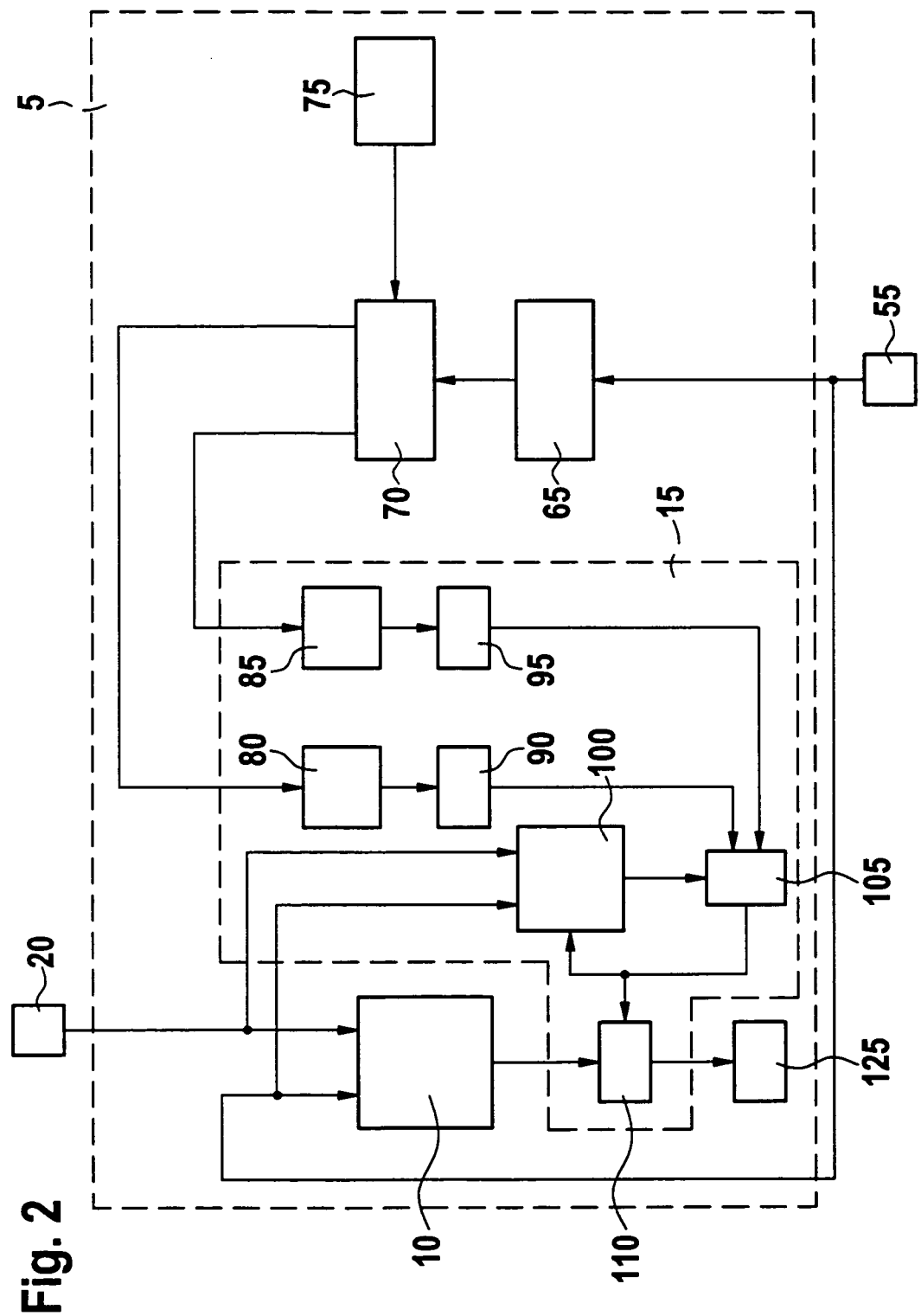
FIG. 2 shows a flow chart to elucidate the method according to the present invention and the device according to the present invention.

FIG. 2 shows a flow chart to elucidate the method according to the present invention and the device according to the present invention, which, on the one hand, allows the retard shifting of the ignition angle to be restricted and, on the other hand, permits this restriction to be individually adapted to the specific combustion engine 45 as well as its state and its normally utilized operating range. The commonly used operating range depends in particular on the driver type or the driving technique, that is to say, on whether the vehicle is driven more in inner-city traffic or on the highway, for instance. The flow chart according to FIG. 2 may be implemented in engine control 5 as software and/or hardware. The flow chart according to FIG. 2 encompasses a detection unit 65, which ascertains at least one value that is representative for reaching the misfire limit of combustion engine 45 or internal combustion engine 1. This at least one value may be an irregular-running value, for instance, which is determined in the manner known from German Patent No. DE 197 06 126, for example, using the measuring signal from crank-angle sensor or engine-speed sensor 55. In addition or as an alternative to the irregular-running value, the number of combustion misses may be ascertained, for example in the manner known from U.S. Pat. No. 6,520,159. Both the irregular-running value and the number of combustion misses are representative for reaching the misfire limit of combustion engine 45 of internal combustion engine 1.

The irregular-running value ascertained in detection unit 65 and/or the number of combustion misses ascertained there are/is conveyed to a comparison element 70 to be compared there to a first limit value for irregular running or with a second limit value for the number of combustion misses, which may be stored in a memory 75 of engine control 5. The first limit value and the second limit value may be applied on a test stand for combustion engine 45, for example, in such a way that they each mark the reaching of the misfire limit of combustion engine 45. The first limit value and the second limit value may be selected such that a predefined safety margin of approximately five percent, for example, still remains before the actual misfire limit of combustion engine 45 is reached. Upon exceeding of the actual misfire limit, combustion engine 45 will invariably cut out completely. This misfire limit may be determined on the test stand so as to ascertain the first limit value and the second limit value, in particular taking the safety margin into account. In comparison element 70, the irregular-running value is compared to the first limit value and/or the number of combustion misses is compared with the second limit value. If all limit values utilized for a comparison are exceeded, comparison element 70 sets a first timing element 80. If all limit values utilized for the comparison are undershot, comparison element 70 sets a second timing element 85. First timing element 80 includes a first time constant, and second timing element 85 includes a second time constant. In this context, the first time constant, for instance, is selected considerably smaller than the second time constant.

After setting first timing element 80 and after the first time constant has elapsed, the output of first timing element is set as well, and thus the input of a decrement-value generator 90, provided the input of first timing element 80 is not set back before the first time constant has elapsed because one of the limit values is undershot again. After setting second timing element 85 and after the second time constant has elapsed, the output of second timing element 85 is set as well, and thus the input of an increment-value generator 95, provided the input of second timing element 85 is not set back before the second time constant has elapsed because one of the limit values is exceeded again. If decrement-value generator 90 is set, it generates at its output a predefined decrement value having a negative operational sign and transmits it to a first summing element 105. If increment-value generator 95 is set, it generates at its output a predefined increment value having a positive operational sign and transmits it to a first summing element 105. First summing element 105 also receives the output signal of an ignition-angle correction map 100, which delivers an ignition angle-correction value as a function of the instantaneous operating point of internal combustion engine 1 or combustion engine 45, the ignition angle-correction value then being transmitted to first summing element 105.

The operating point of internal combustion engine 1 is determined as a function of the engine speed, which is ascertained by the crank-angle sensor or engine-speed sensor, and from the engine load, which is determined as a function of the fresh-air mass flow using mass air-flow sensor 20, in a manner known to one skilled in the art. In alternative embodiments, the engine load may also be ascertained via the intake-manifold pressure, which would have to be determined by a suitable pressure sensor in intake manifold 30, or by another variable characterizing the charge of the cylinders of combustion engine 45, such as the engine torque or the engine output, or by a variable derived from one of the mentioned variables. Ignition-angle correction map 100 may be applied, for instance, on a test stand, initially for various operating points of internal combustion engine 1; operating points that are not established in the application may be made to specify an associated ignition-angle correction value, by means of interpolation, for instance. As an alternative, it is possible to initially set the ignition angle correction map to zero for all operating points of internal combustion engine 1.

Furthermore, an ignition-angle restriction map 10 is provided, which likewise outputs an ignition-angle restriction value as a function of the respective operating point of internal combustion engine 1, that is, as a function of the engine speed and the fresh mass-air flow in this example, transmitting this ignition-angle restriction value to a second summing element 110. Ignition-angle restriction map 10 may likewise be applied on a test stand for various operating points of internal combustion engine 1, each of these operating points being assigned an ignition-angle restriction value that must not be exceeded by the ignition angle to be set by engine control 5, that is to say, a more retarded ignition angle is not permitted since the misfire limit of internal combustion engine 1 will otherwise be exceeded and combustion engine 45 shut down. Operating points of internal combustion engine 1 that are not established in the application may be utilized in ignition-angle restriction map 10 to specify an associated ignition-angle restriction value, using interpolation, for example. If ignition-angle correction map 100 is initially not set to zero, the application of ignition-angle correction map 100 and ignition-angle restriction map 10 may be coordinated on a test stand, for example, in such a way that the sum of the ignition-angle restriction value and the ignition-angle correction value leads to a resulting ignition-angle restriction value for each operating point that is applied or interpolated and whose exceeding results in an exceeding of the misfire limit of internal combustion engine 1, and which is thus representative for the misfire limit of internal combustion engine 1.

In first summing element 105, the output of decrement-value generator 90, increment-value generator 95 and ignition-angle correction map 100 is superposed in an additive manner. The generated sum is transmitted to second summing element 110 where it is added to the output of ignition-angle restriction map 10. The output of first summing element 105 is also transmitted to ignition-angle correction map 100 where it replaces the ignition-angle correction value for the instantaneous operating point of internal combustion engine 1, so that a temporal adaptation of ignition-angle correction map 110 is performed. Ignition-angle correction map 100 may in this way be adapted to a changing misfire limit of combustion engine 45 or internal combustion engine 1. Such a change in the misfire limit may come about with increasing age and wear and also as a function of the driving habits of the individual driver, i.e., from the predominantly utilized operating range of internal combustion engine 1. The output of second summing element 110 is transmitted to a restriction element 125, which, in a manner known to one skilled in the art and not shown in FIG. 2, restricts the ignition angle to be set by engine control 5 as a function of the resulting torque request or as a function of a torque reserve to be set, and prevents a retard shifting beyond the ignition-angle restriction value available at the output of second summing element 110.

It has been described earlier that the first time constant, for instance, may be selected considerably smaller than the second time constant. When the misfire limit is exceeded, this has the advantage that the generation of the decrement value may be activated relatively quickly, so that the ignition-angle restriction value from ignition-angle restriction map 10 is able to be reduced, thereby preventing an operation of internal combustion engine 1 above the misfire limit, if possible. Vice versa, when the misfire limit is undershot, the misfire limit is approached more slowly and thus more carefully with the aid of the incremental value so that the ignition-angle restriction value is not raised too rapidly and the misfire limit is thus not reached too soon. As an alternative, of course, the two time constants may also be of equal magnitude. It is likewise also possible to select the first time constant greater than the second time constant or to select the first constant to be only slightly lower than the second time constant.

The decrement value and the increment value may be selected to be of equal magnitude. However, the decrement value may also be selected greater in its amount than the increment value in order to ensure, on the one hand, that after exceeding the misfire limit it is undershot again after the fewest number of iteration steps possible and, on the other hand, to ensure that more iteration steps are allowed for approaching the misfire limit from below, thereby making it possible to approach the misfire limit more slowly and accurately. As an alternative, of course, the decrement value may also be selected smaller in its amount than the increment value.

Depending on whether the misfire limit of internal combustion engine 1 is exceeded or undershot, and whether this exceeding lasts at least as long as the first time constant, or this undershooting lasts at least as long as the second time constant, either the output of decrement-value generator 90 or the output of increment-value generator 95 is set, so that first summing element 105 is provided with either the decrement value or the increment value. Otherwise, first summing element 105 is supplied with only the output of ignition-angle correction map 100, so that in this case the output of ignition-angle correction map 100 corresponds to the output of first summing element 105. In the event that the decrement value or the increment value is present at the output of decrement-value generator 90 or increment-value generator 95, respectively, this occurs only for the duration of one computing cycle, so that the output of ignition-angle correction map 100 is decremented or incremented only once per setting procedure of first timing element 80 or second timing element 85, respectively.

After the first time constant or the second time constant has elapsed, first timing element 80 or second timing element 85 is set back again, so that a setting of one of the two timing elements 80, 85 and thus the generation of the decrement value or the increment value is possible again only after renewed exceeding or undershooting of the misfire limit of internal combustion engine 1. In this way, an adaptation of ignition-angle correction map 100 over time may be realized and thus a learning process, which makes it possible to keep the ignition-angle restriction as close as possible to the actual misfire limit of internal combustion engine 1. This permits an optimal margin for generating a torque reserve for the conversion of a torque request of one of the aforementioned functions or drivability functions, for instance. The decrement value and the increment value each represent a predefined adaptation increment.

Reference numeral 15 in FIG. 2 denotes a correction unit, which includes detection unit 65, comparison element 70, memory 75, first timing element 80, second timing element 85, decrement-value generator 90, increment-value generator 95, first summing element 105, second summing element 110 and ignition-angle correction map 100. With the aid of this correction unit 15, the ignition-angle restriction value provided by ignition-angle restriction map 10 is corrected and the ignition-angle restriction implemented on the basis of the corrected ignition-angle restriction value.

In an alternative specific embodiment, it may also be provided that, depending on the activated vehicle function or drivability function, a different ignition-angle restriction map and a different ignition-angle correction map associated therewith be utilized in the block diagram according to FIG. 2, because different misfire limits may be provided for different activated vehicle functions or drivability functions. In this case, it is possible to also predefine and select the limit values in memory 75 as a function of the currently activated vehicle function or drivability function. For instance, it may be allowed in a drivability function that the actual misfire limit of internal combustion engine 1, which must be observed regardless of the vehicle functions or drivability functions in order to prevent combustion engine 45 from shutting down, be exceeded for two or three combustion cycles without combustion engine 45 shutting down for that reason already, and that such exceeding be permitted.

What is claimed is:

1. A method for operating an internal combustion engine, the method comprising:
    specifying a limit value for an ignition angle as a function of an operating point of the engine; and
    correcting the limit value for the ignition angle as a function of a misfire limit of the engine.

2. The method according to claim 1, further comprising ascertaining the misfire limit of the engine as a function of an irregular running of the engine.

3. A method for operating an internal combustion engine, comprising:
    specifying a limit value for an ignition angle as a function of an operating point of the engine;
    correcting the limit value for the ignition angle as a function of a misfire limit of the engine; and
    ascertaining the misfire limit of the engine as a function of a number of combustion misses.

4. A method for operating an internal combustion engine, comprising:
    specifying a limit value for an ignition angle as a function of an operating point of the engine; and
    correcting the limit value for the ignition angle as a function of a misfire limit of the engine;
    wherein the limit value for the ignition angle is corrected in an advance direction if the misfire limit of the engine is exceeded for a first predefined time.

5. The method according to claim 4, wherein the limit value for the ignition angle is corrected in a retard direction if the misfire limit of the engine is not reached for a second predefined time.

6. A method for operating an internal combustion engine, comprising:
    specifying a limit value for an ignition angle as a function of an operating point of the engine;
    correcting the limit value for the ignition angle as a function of a misfire limit of the engine; and
    adapting a new correction value for a correction of the limit value for the ignition angle from a previous correction value for at least one operating point of the engine.

7. The method according to claim 6, wherein the adaptation of the correction value is implemented using a predefined adaptation increment.

8. A device for operating an internal combustion engine comprising:
    setpoint-selection means for specifying a limit value for an ignition angle as a function of an operating point of the engine; and
    correction means for correcting the limit value for the ignition angle as a function of a misfire limit of the engine.

9. The method according to claim 1, wherein the limit value for the ignition angle is corrected in a retard direction if the misfire limit of the engine is not reached for a predefined time.

* * * * *